US009116527B2

(12) United States Patent
Maeda

(10) Patent No.: US 9,116,527 B2
(45) Date of Patent: Aug. 25, 2015

(54) MOTOR CONTROL SYSTEM THAT DETECTS VOLTAGE SATURATION

(71) Applicant: FANUC CORPORATION, Yamanashi (JP)

(72) Inventor: Kazuomi Maeda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/217,722

(22) Filed: Mar. 18, 2014

(65) Prior Publication Data

US 2014/0285129 A1    Sep. 25, 2014

(30) Foreign Application Priority Data

Mar. 19, 2013 (JP) ................................. 2013-056600

(51) Int. Cl.
*H02H 7/09* (2006.01)
*G05D 13/62* (2006.01)

(52) U.S. Cl.
CPC ...................... *G05D 13/62* (2013.01)

(58) Field of Classification Search
CPC ... G05F 1/565; H02M 3/156; H02M 3/33507; H02M 2001/0009; H02M 2001/0025; G05D 13/62
USPC ................. 318/560, 567, 569, 570, 609, 610, 318/400.21, 400.22, 432
See application file for complete search history.

(56) References Cited

U.S. PATENT DOCUMENTS 5,006,770 A * 4/1991 Sakamoto et al. ............ 318/561
5,023,924 A * 6/1991 Tajima et al. ................. 388/811
5,955,863 A * 9/1999 Iwashita et al. ............... 318/812
6,768,280 B2 * 7/2004 Kitajima ....................... 318/432
7,102,305 B2 * 9/2006 Suzuki ...................... 318/400.02

(Continued)

FOREIGN PATENT DOCUMENTS

CN          101097438 A    1/2008
CN          102487263 A    6/2012

(Continued)

OTHER PUBLICATIONS

English Machine Translation of Abstract for Chinese Publication No. 102487263, published Jun. 6, 2012, 1 page.

(Continued)

*Primary Examiner* — Bentsu Ro
*Assistant Examiner* — Thai Dinh
(74) *Attorney, Agent, or Firm* — Fredrikson & Byron, P.A.

(57) ABSTRACT

A motor control system comprises a plurality of control apparatuses and a host control apparatus, wherein each of the control apparatuses include a position control unit controlling position based on a position command and commanded speed from the host control apparatus, a speed control unit controlling speed based on a speed command from the position control unit, a current control unit controlling current based on a current command from the speed control unit, and a current amplifier which amplifies motor driving current based on a voltage command from the current control unit, and wherein the current control unit includes a voltage saturation processing unit which determines whether the voltage command has exceeded supply voltage of the current amplifier, and which outputs the result of the determination, and a voltage saturation notifying unit which notifies the host control apparatus of the result of the determination made by the voltage saturation processing unit.

7 Claims, 15 Drawing Sheets

(56) References Cited

U.S. PATENT DOCUMENTS

| | | | |
|---|---|---|---|
| 7,936,144 B2 * | 5/2011 | Vig et al. ................. 318/632 |
| 2011/0231066 A1 | 9/2011 | Ohno et al. | |

FOREIGN PATENT DOCUMENTS

| JP | 2000341991 A | 12/2000 |
|---|---|---|
| JP | 2003209996 A | 7/2003 |
| JP | 2010004681 A | 1/2010 |
| JP | 2011194914 A | 10/2011 |

OTHER PUBLICATIONS

English Machine Translation of Abstract for Chinese Publication No. 101097438, published Jan. 2, 2008, 1 page.

* cited by examiner

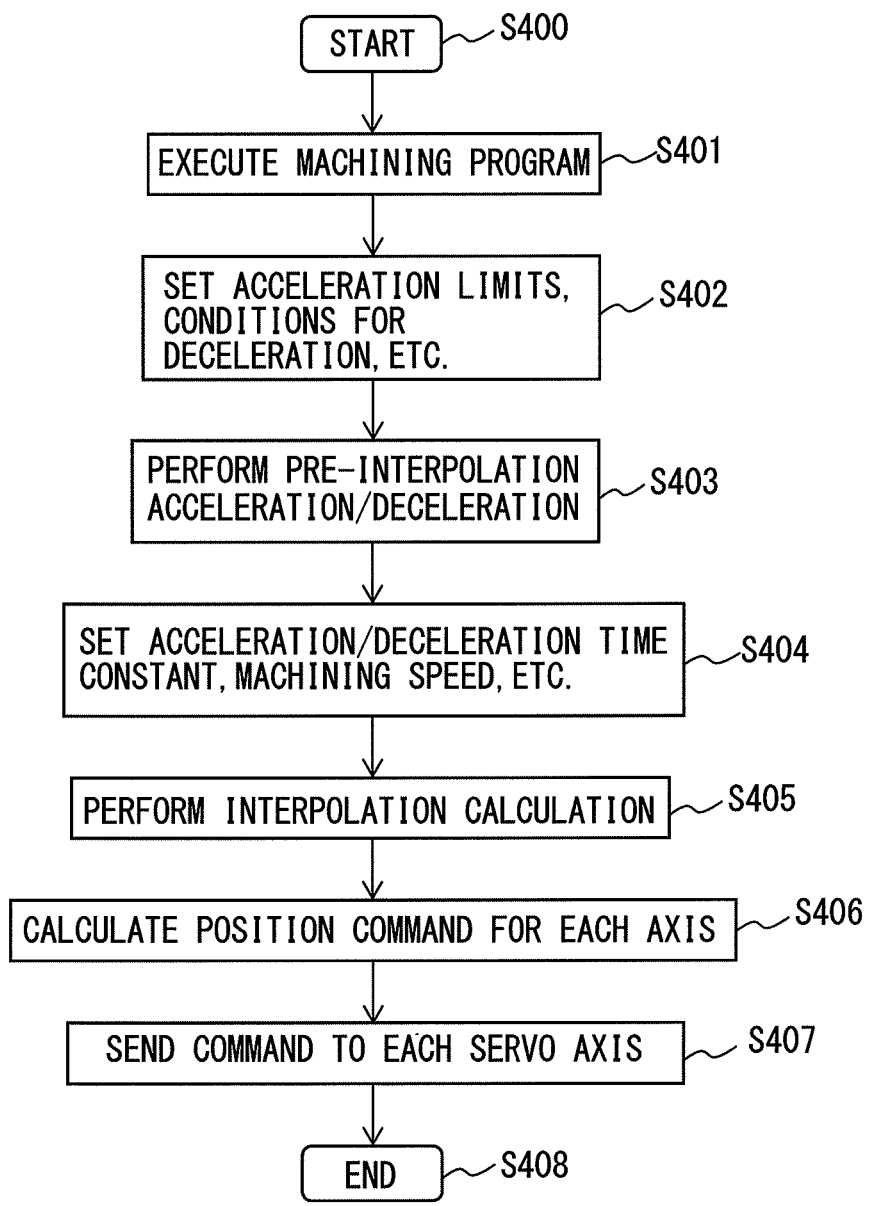

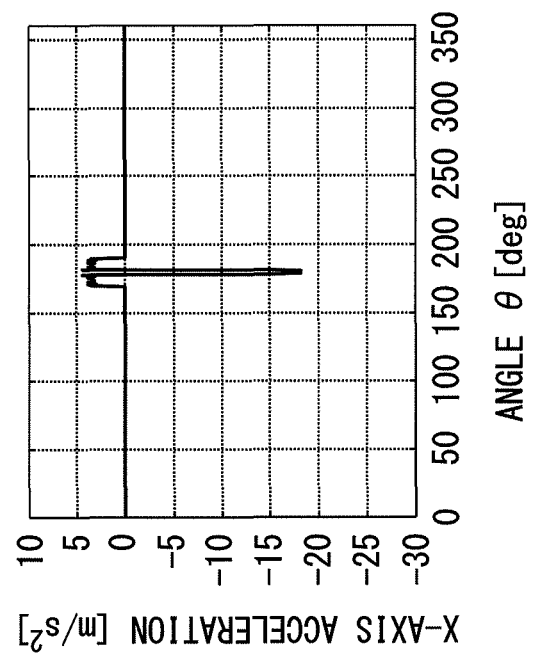
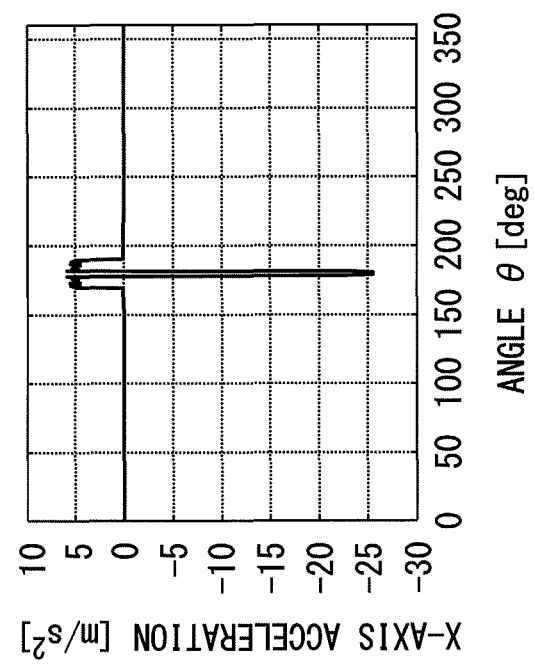

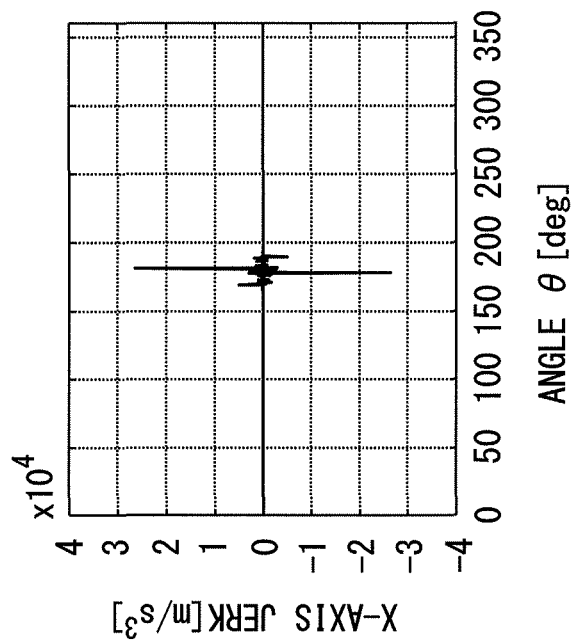
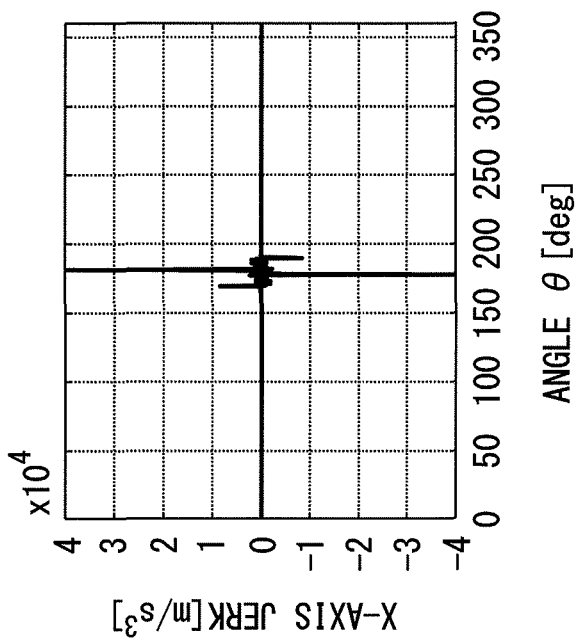
FIG. 12A
FIG. 12B

MOTOR CONTROL SYSTEM THAT DETECTS VOLTAGE SATURATION

CROSS-REFERENCE TO RELATED APPLICATIONS

This application is a new U.S. patent application that claims benefit of JP 2013-056600, filed on Mar. 19, 2013, the entire content of JP 2013-056600 is hereby incorporated by reference.

FIELD OF THE INVENTION

The present invention relates to a motor control system, and more particularly to a motor control system that can detect voltage saturation occurring in a current amplifier used for driving a motor and can notify a host control apparatus accordingly.

BACKGROUND OF THE INVENTION

In a system such as a machine tool that is driven using a synchronous motor, if the commanded acceleration is large, the maximum torque of the synchronous motor may be exceeded and the motor may become unable to be operated as commanded. Similarly, depending on the inductance of the synchronous motor, if the commanded jerk is large, the commanded voltage of the synchronous motor may exceed the maximum voltage of a current amplifier and the motor may become unable to be operated as commanded. The condition in which the commanded voltage of the synchronous motor exceeds the maximum voltage of the current amplifier is called the "voltage saturation".

In view of the above, there is proposed a control apparatus that detects whether or not the commanded voltage causes voltage saturation (for example, refer to Japanese Unexamined Patent Publications No. JP-A-2000-341991, or JP-A-2003-209996). FIG. 1 shows the configuration of a motor control apparatus according to the prior art. The prior art control apparatus comprises: a saturation detector 1009 which detects whether the magnitude of the voltage command applied to a power converter 101 exceeds the maximum voltage that the power converter 101 can apply to a PM motor 1002, and which outputs a voltage saturation signal that is set to "−1" when the maximum voltage is exceeded and voltage saturation has occurred, and otherwise set to "1"; and a magnetic flux current adjuster 1010 which, when the voltage saturation signal output from the saturation detector 1009 is "1", causes the d-axis current idc to gradually increase in the positive direction until reaching a predetermined upper limit value and, when the voltage saturation signal is "−1", causes the d-axis current idc to gradually increase in the negative direction until reaching a predetermined lower limit value. With the above configuration, it is possible to automatically adjust the magnitude of the d-axis current idc and thereby prevent the voltage command Vc from exceeding the maximum voltage Vm that the power converter 101 can output. Further, the q-axis current and d-axis current can be made to follow their current commands. Thus, even when the voltage is saturated, operation can be continued and, when the voltage is not saturated, the operating state with maximum efficiency can be achieved.

As described above, JP-A-2000-341991 (hereinafter, referred to as "patent document 1") discloses detecting and outputting voltage saturation and reducing the current command value. However, while patent document 1 describes that the current command value is reduced in the case of voltage saturation, reducing the current command value results in an inability to produce torque as commanded by a torque command. As a result, the tool cannot be moved to the commanded position at the commanded speed in order to generate the commanded shape; in particular, when generating the contour shape of a workpiece by controlling a plurality of axes, there arises the problem that the accuracy of the shape degrades.

It is an object of the present invention to provide a motor control system that has the function of suppressing the commanded jerk by detecting the presence or absence of voltage saturation and by notifying a host control apparatus of the result of the detection.

SUMMARY OF THE INVENTION

A motor control system according to an embodiment of the present invention comprises a plurality of control apparatuses for controlling a motor, and a host control apparatus which provides a command to the control apparatus, wherein each of the control apparatuses each include a position control unit which controls position based on a position command and commanded speed provided from the host control apparatus, a speed control unit which controls speed based on a speed command supplied from the position control unit, a current control unit which controls current based on a current command supplied from the speed control unit, and a current amplifier which amplifies motor driving current based on a voltage command supplied from the current control unit, and wherein the current control unit includes a voltage saturation processing unit which determines whether the voltage command has exceeded supply voltage of the current amplifier, and which outputs the result of the determination, and a voltage saturation notifying unit which notifies the host control apparatus of the result of the determination made by the voltage saturation processing unit.

According to an embodiment of the present invention, the host control apparatus is notified of the occurrence of voltage saturation, in response to which the feed speed can be reduced in order to avoid voltage saturation, thus making it possible to maintain the machining accuracy.

DESCRIPTION OF THE DRAWINGS

These and other features and advantages of the present invention will be better understood by reading the following detailed description, taken together with the drawings wherein:

FIG. 7 is a flowchart illustrating a procedure for interpolation calculation in the motor control system according to the first embodiment of the present invention;

FIG. 11A is a diagram showing the angular dependence of X-axis acceleration when the machining speed is set to 120 [mm/sec];

FIG. 11B is a diagram showing the angular dependence of X-axis acceleration when the machining speed is set to 100 [mm/sec];

FIG. 12A is a diagram showing the angular dependence of X-axis jerk when the machining speed is set to 120 [mm/sec];

FIG. 12B is a diagram showing the angular dependence of X-axis jerk when the machining speed is set to 100 [mm/sec];

DETAILED DESCRIPTION OF THE PREFERRED EMBODIMENT

A motor control system according to an embodiment of the present invention will be described in detail below with reference to the drawings. It will, however, be noted that the technical scope of the present invention is not limited by any particular embodiment described herein but extends to the inventions described in the appended claims and their equivalents.

Embodiment 1

Figure 1:
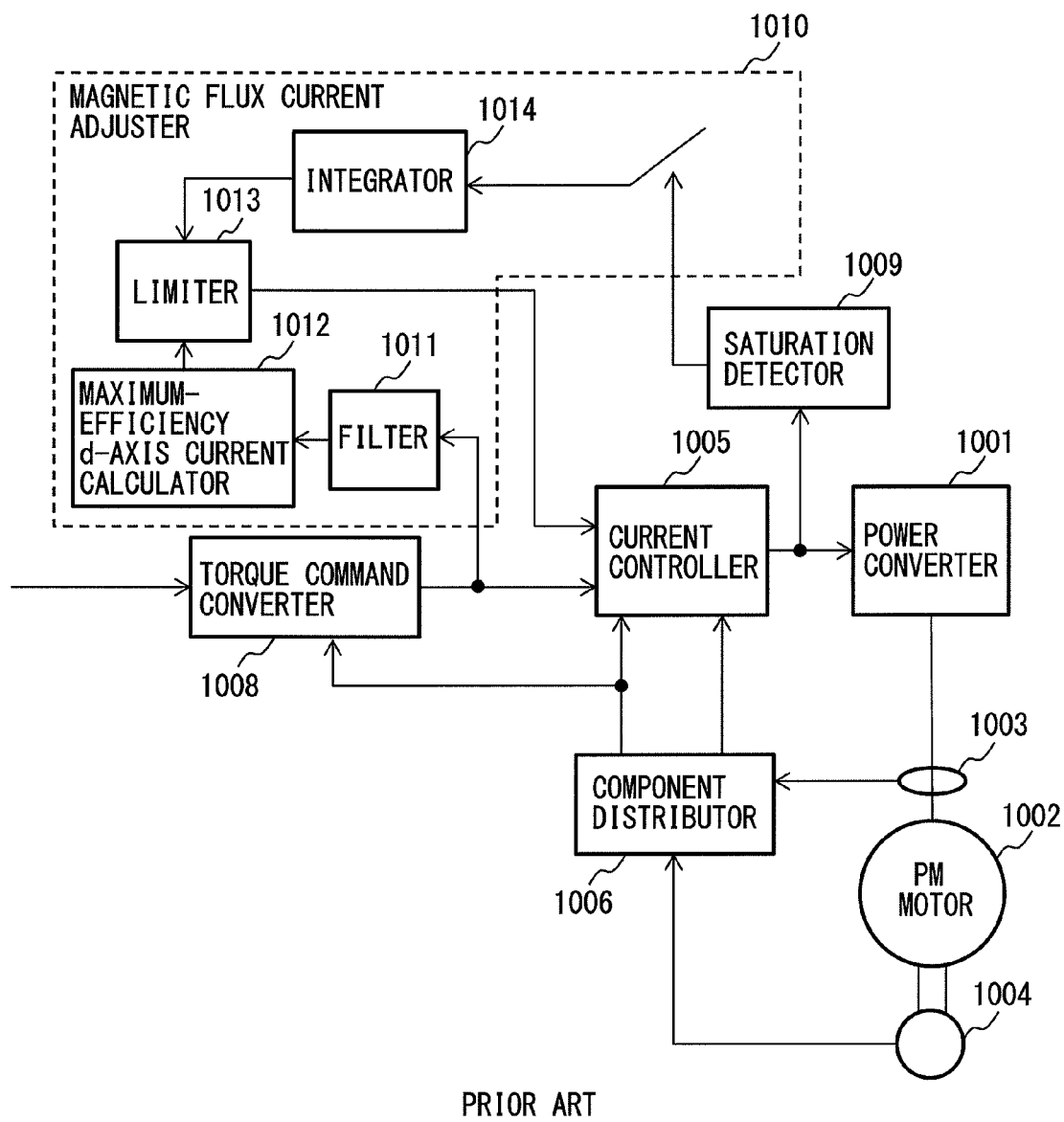
FIG. 1 is a diagram showing the configuration of a motor control apparatus according to the prior art.
Figure 2:
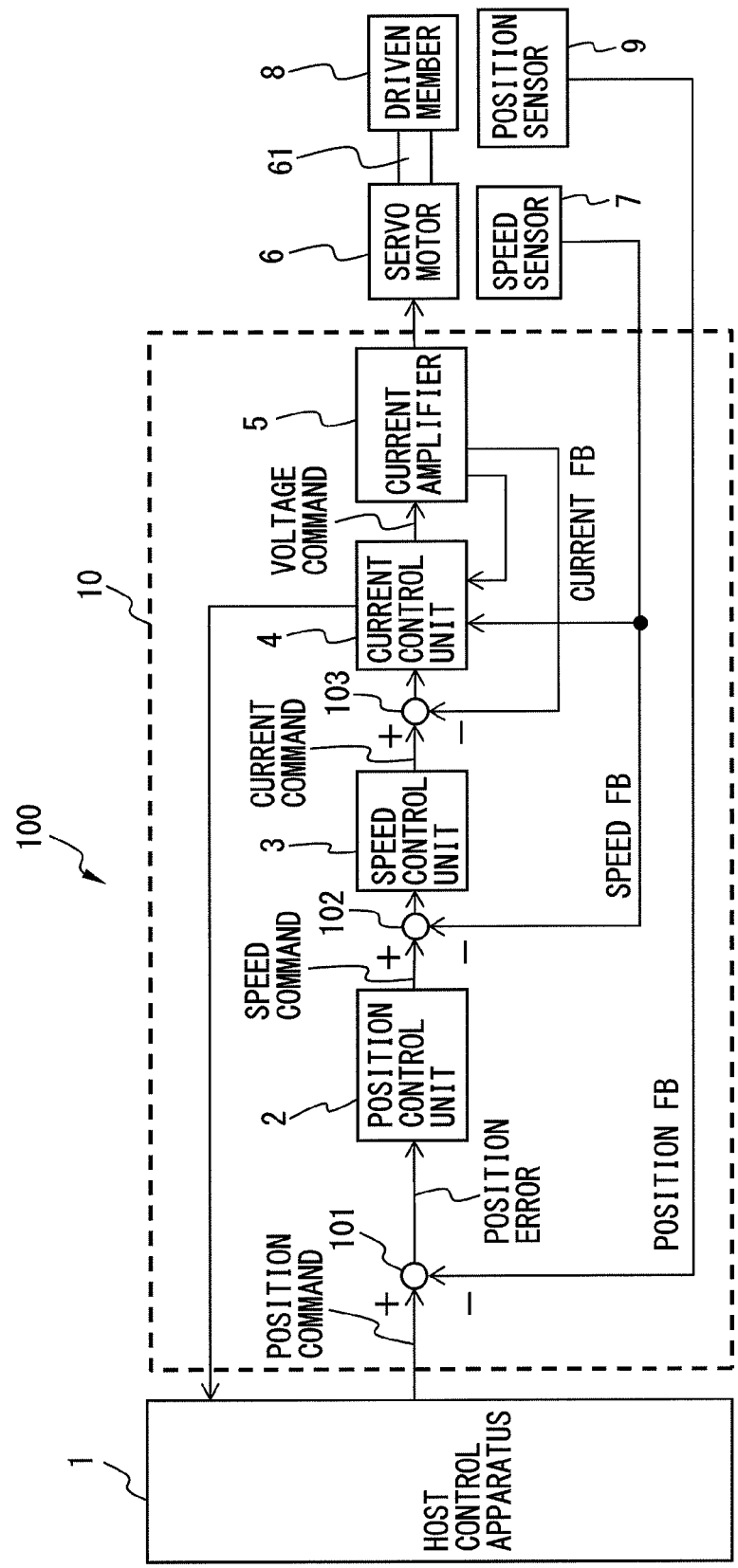
FIG. 2 is a diagram showing the configuration of a motor control system according to a first embodiment of the present invention.
Figure 3:
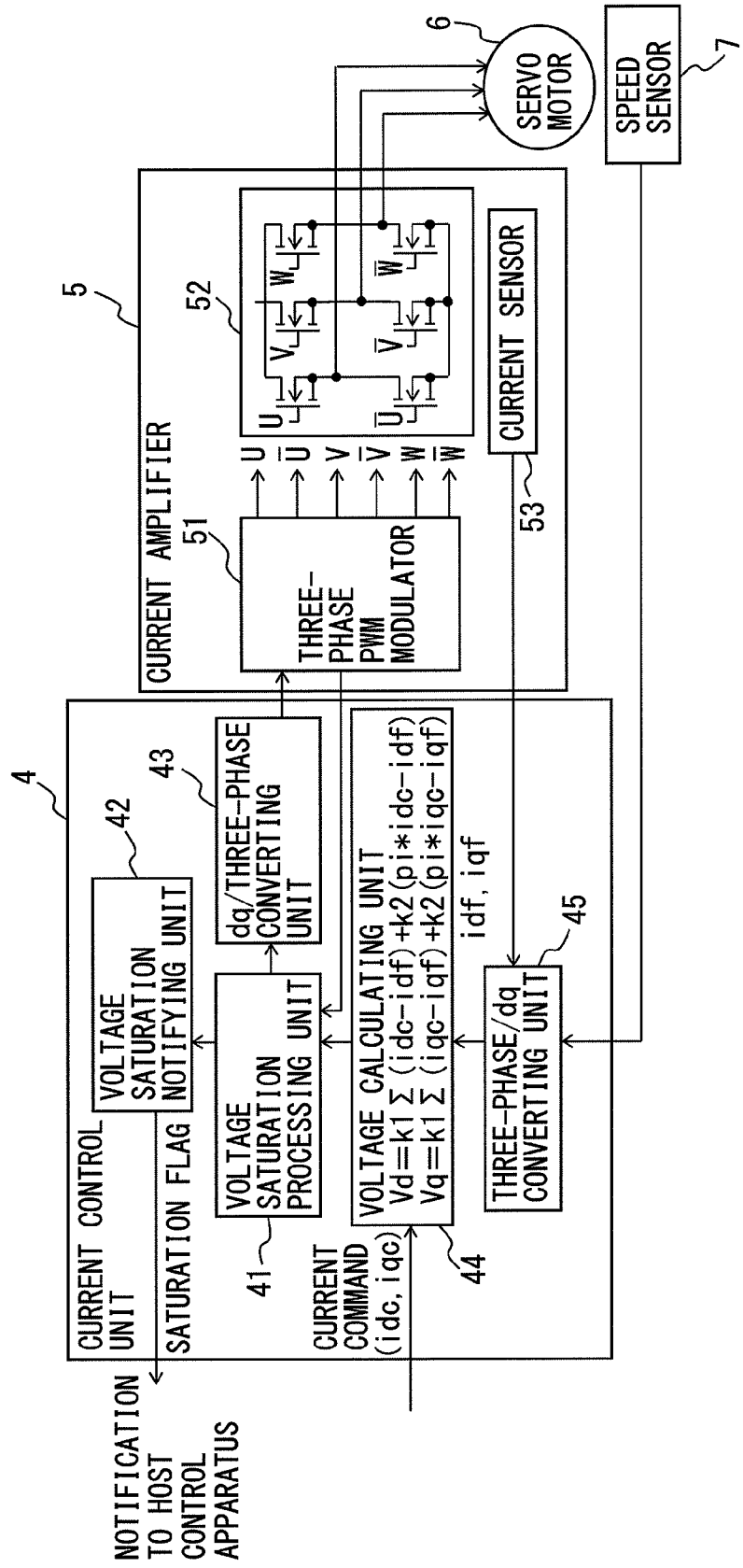
FIG. 3 is a diagram showing the configuration of a current control unit and a current amplifier in the motor control system according to the first embodiment of the present invention.

FIG. 2 shows the configuration of a motor control system 100 according to a first embodiment of the present invention, and FIG. 3 shows in detail the configuration of a current control unit 4 and a current amplifier 5 in a control apparatus 10 constituting the motor control system 100. The motor control system 100 of the present invention comprises the control apparatus 10 which controls a motor, and a host control apparatus 1 which provides a command to the control apparatus 10. The control apparatus 10 includes a position control unit 2 which controls position based on a position command and commanded speed provided from the host control apparatus 1, a speed control unit 3 which controls speed based on a speed command supplied from the position control unit 2, a current control unit 4 which controls current based on a current command supplied from the speed control unit 3, and a current amplifier 5 which amplifies current for driving a driven member 8, or the motor, based on a voltage command supplied from the current control unit 4, wherein the current control unit 4 includes a voltage saturation processing unit 41 which determines whether the voltage command has exceeded the supply voltage of the current amplifier 5, and which outputs the result of the determination, and a voltage saturation notifying unit 42 which notifies the host control apparatus 1 of the result of the determination made by the voltage saturation processing unit 41.

As shown in FIG. 2, the position command output from the host control apparatus 1 is supplied as an input to a first adder 101 where position feedback data (position FB) supplied from a position sensor 9 provided to detect the position of the driven member 8 is subtracted from the position command, and the resulting position error is supplied to the position control unit 2.

Based on the position error thus input, the position control unit 2 produces the speed command for output. The speed command output from the position control unit 2 is supplied as an input to a second adder 102 where speed feedback data (speed FB) supplied from a speed sensor 7 provided to detect the speed of the driven member 8 is subtracted from the speed command, and the resulting speed command is supplied to the speed control unit 3.

Based on the speed command thus input, the speed control unit 3 produces the current command for output. The current command output from the speed control unit 3 is supplied as an input to a third adder 103 where current feedback data (current FB) supplied from the current amplifier 5 is subtracted from the current command, and the resulting current command is supplied to the current control unit 4.

Based on the current command thus input, the current control unit 4 produces the voltage command for output to the current amplifier 5. The current amplifier 5 feeds back the result of the current detection to the current control unit 4 which detects the presence or absence of voltage saturation as will be described in detail later.

The current amplifier 5 outputs the current for driving the servo motor 6 which drives the driven member 8 via a transmission mechanism 61.

Next, the configuration of the current control unit 4 and current amplifier 5 will be described with reference to FIG. 3. As shown in FIG. 3, the current control unit 4 includes, in addition to the voltage saturation processing unit 41 and the voltage saturation notifying unit 42, a dq/three-phase converting unit 43, a voltage calculating unit 44, and a three-phase/dq converting unit 45.

On the other hand, the current amplifier 5 includes a three-phase PWM modulator 51, a motor driving circuit 52, and a current sensor 53. The three-phase PWM modulator 51 generates a PWM signal having a duty cycle corresponding to the voltage command value. The motor driving circuit 52 is a PWM voltage inverter constructed from switching devices such as power MOS transistors. By controlling the on/off operation of each switching device in accordance with the PWM signal, the motor driving circuit 52 generates the three-phase voltage to be applied to the servo motor 6. The current sensor 53 detects the current flowing in the motor driving circuit 52, and feeds back the result to the current control unit 4.

The current value fed back from the current sensor 53 of the current amplifier 5 is input to the three-phase/dq converting unit 45 in the current control unit 4 together with the current value output from the speed sensor 7 of the servo motor 6, and the three-phase/dq converting unit 45 outputs fed-back currents idf and iqf. Based on the current command values idc and iqc and the fed-back currents idf and iqf, the voltage calculating unit 44 calculates d-phase voltage Vd and q-phase voltage Vq in accordance with the following equations.

$$Vd = k1 \Sigma(idc - idf) + k2(pi * idc - idf) \quad (1)$$

$$Vq = k1 \Sigma(iqc - iqf) + k2(pi * iqc - iqf)$$

where k1 is the integral gain, and k2 is the proportional gain. Further, pi is the current PI ratio, which is 0 in the case of I-P control and 1 in the case of PI control.

Figure 4:
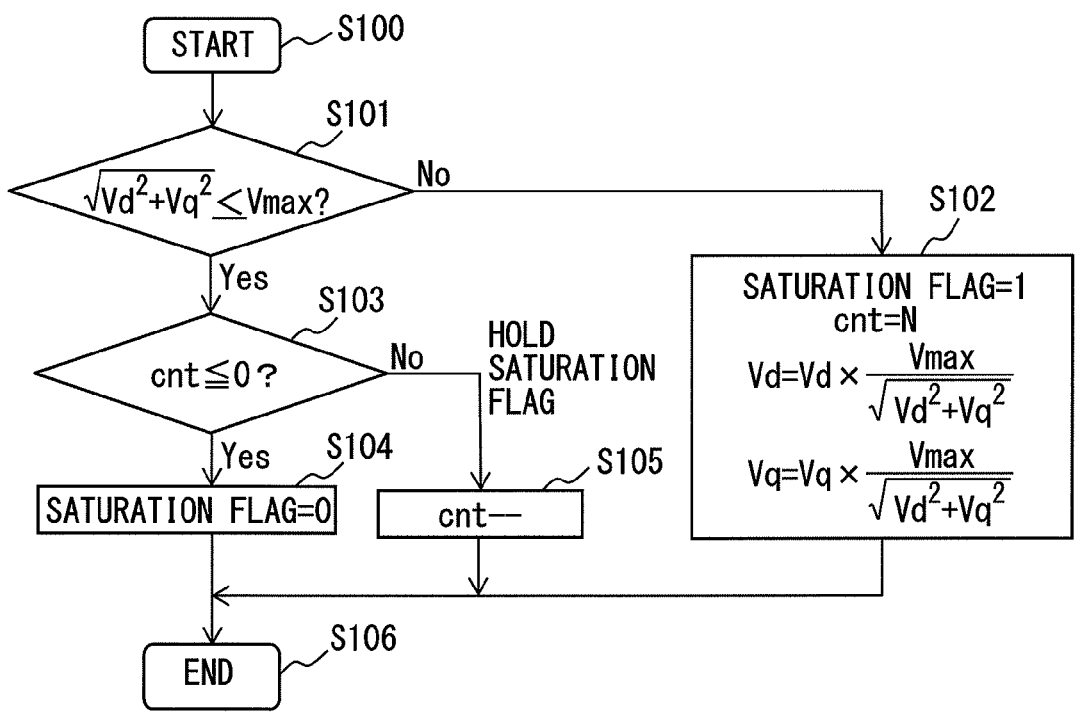
FIG. 4 is a flowchart illustrating the operation of a voltage saturation processing unit in the motor control system according to the first embodiment of the present invention.

The voltages Vd and Vq calculated by the voltage calculating unit 44 are input to the voltage saturation processing unit 41 which detects the presence or absence of voltage saturation. Referring to the flowchart of FIG. 4, a description will be given of how the voltage saturation processing unit 41 detects the presence or absence of voltage saturation. First, in step S101, RMS voltage $V = \sqrt{(Vd^2 + Vq^2)}$ is calculated from Vd and Vq, and it is determined whether or not the RMS voltage V is less than or equal to the maximum value Vmax of the supply voltage of the current amplifier 5. If the RMS voltage V is larger than Vmax, then in step S102 the saturation flag is set to 1 and the counter variable cnt is set to N. Further, Vd and Vq are converted to unsaturated values in accordance with the following equations.

$$Vd = Vd \times Vmax / \sqrt{(Vd^2 + Vq^2)}$$

$$Vq = Vq \times Vmax / \sqrt{(Vd^2 + Vq^2)} \quad (2)$$

On the other hand, if it is determined in step S101 that the RMS voltage V is less than or equal to Vmax, then in step S103 it is determined whether or not the count number cnt is less than or equal to 0. If the count number cnt is less than or equal to 0, the saturation flag is set to 0 in step S104. On the other hand, if it is determined in step S103 that the count number cnt is larger than 0, the count number cnt is decremented by 1 in step S105. With the above flow, the saturation flag is held at 1 for a predetermined period after the saturation flag is set to 1. For example, suppose that the flow is executed once in every millisecond; then, by setting N=1000, the flag state can be held fixed for one second after the saturation has occurred.

The saturation flag value calculated by the voltage saturation processing unit 41 is supplied to the voltage saturation notifying unit 42 which notifies the host control apparatus 1 of the saturation flag value.

The voltage saturation processing unit 41 supplies the unsaturated d-phase voltage Vd and q-phase voltage Vq as inputs to the dq/three-phase converting unit 43. More specifically, if no voltage saturation has occurred, the voltages Vd and Vq calculated in accordance with the equations (1) are directly output, but if voltage saturation has occurred, the voltages Vd and Vq calculated by the equations (1) are output after converting them in accordance with the equations (2).

Figure 5:
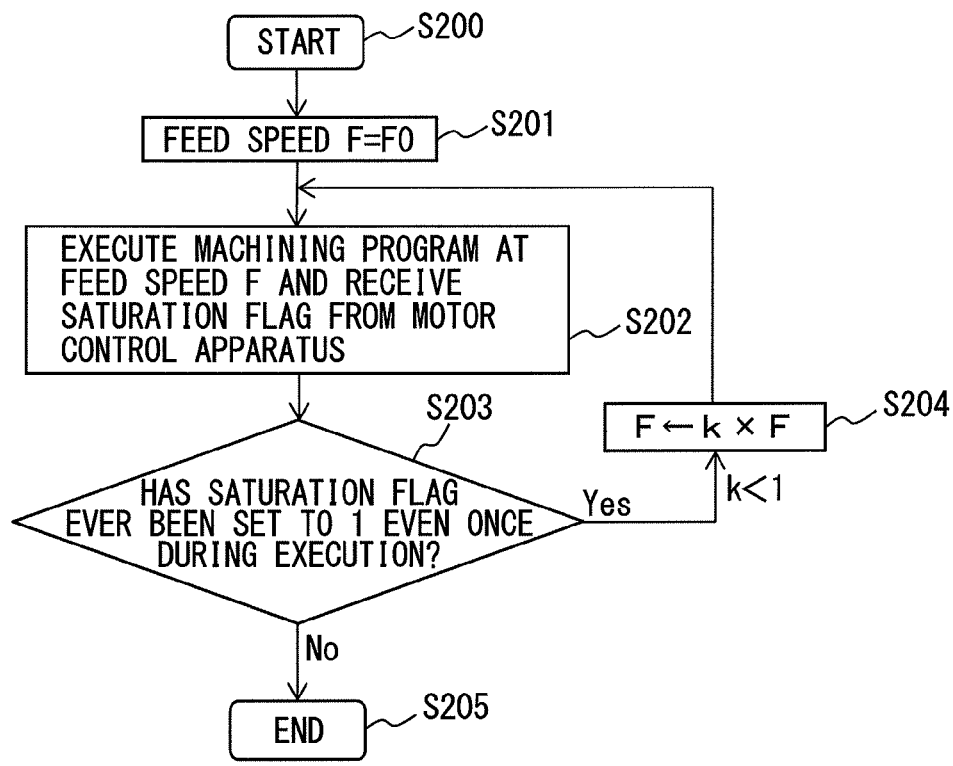
FIG. 5 is a flowchart illustrating a method of changing feed speed in the motor control system according to the first embodiment of the present invention.

Next, a description will be given of how feed speed and maximum acceleration are changed in the host control apparatus 1 in response to the saturation flag received from the voltage saturation notifying unit 42. FIG. 5 shows a flowchart illustrating the procedure for changing the feed speed. As shown in FIG. 5, first in step S201, the feed speed F is set to its initial value F0. Next, in step S202, a machining program is executed at the feed speed F, and a saturation flag is received from the motor control apparatus 10.

Then, in step S203, it is determined whether the saturation flag has ever been set to 1 even once during the execution of the machining program. If the saturation flag has been set to 1 even once during the execution of the machining program, then in step S204 the feed speed F is multiplied by a coefficient k, and the resulting value is set as the new feed speed F. Since the coefficient k is a positive value smaller than 1, the feed speed decreases. The coefficient k is stored as a parameter or a program fixed value in the host control apparatus 1. On the other hand, if the saturation flag has not been set to 1 even once during the execution of the machining program, the feed speed F is maintained at its initial value F0. The above flow is executed after the end of machining, and if saturation has occurred even once during the machining, the machining speed is reduced for the next cycle of machining.

Figure 6:
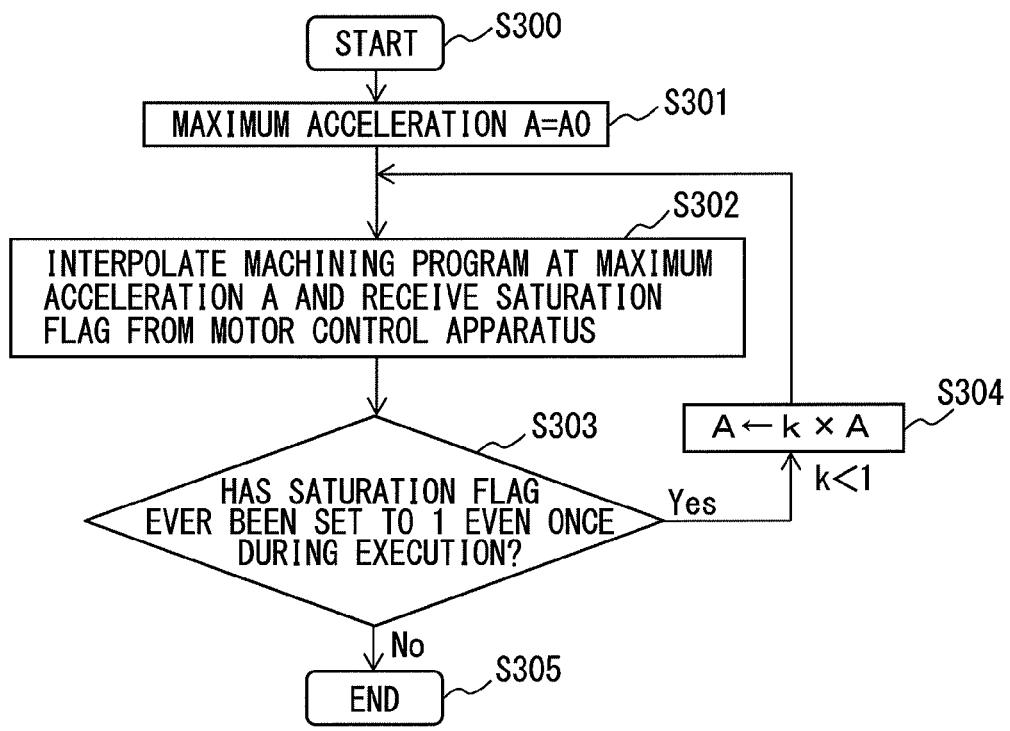
FIG. 6 is a flowchart illustrating a method of changing maximum acceleration in the motor control system according to the first embodiment of the present invention.

Next, a description will be given of how the maximum acceleration is changed. FIG. 6 shows a flowchart illustrating the procedure for changing the maximum acceleration. As shown in FIG. 6, first in step S301, the maximum acceleration A is set to its initial value A0. Next, in step S302, the machining program is interpolated at the maximum acceleration A, and a saturation flag is received from the motor control apparatus 10.

Then, in step S303, it is determined whether the saturation flag has ever been set to 1 even once during the execution of the machining program. If the saturation flag has ever been set to 1 even once during the execution of the machining program, then in step S304 the maximum acceleration A is multiplied by a coefficient k, and the resulting value is set as the new maximum acceleration A. Since the coefficient k is a positive value smaller than 1, the maximum acceleration decreases. On the other hand, if the saturation flag has not been set to 1 even once during the execution of the machining program, the maximum acceleration A is maintained at its initial value A0.

The feed speed and maximum acceleration are determined by the host control apparatus 1 in the above manner. Next, a procedure for calculating the position command for each axis based on the thus determined feed speed and maximum acceleration will be described with reference to the flowchart of FIG. 7. First, in step S401, the machining program is executed. Next, in step S402, parameters such as acceleration limits and conditions for deceleration are set. In step S403, pre-interpolation acceleration/deceleration control is performed to calculate the speed command for acceleration/deceleration control of each axis based on the NC (Numerical Control) commanded feed speed before initiating the interpolation. At this time, the feed speed and maximum acceleration are adjusted depending on the value of the saturation flag.

In step S404, parameters such as acceleration/deceleration time constant and machining speed are set. Next, in step S405, an interpolation calculation is performed. The interpolation calculation is performed by linearly or circularly interpolating between two points commanded by position commands.

Next, in step S406, the position command for each axis is calculated. Finally, in step S407, the thus calculated position command is sent to each servo axis to drive the servo axis.

Figure 8A:
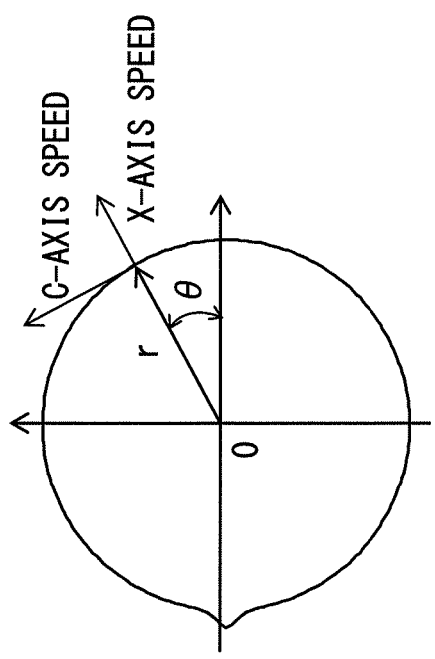
FIG. 8A is a diagram showing the locus of a machining point by using a polar coordinate system.
Figure 8B:
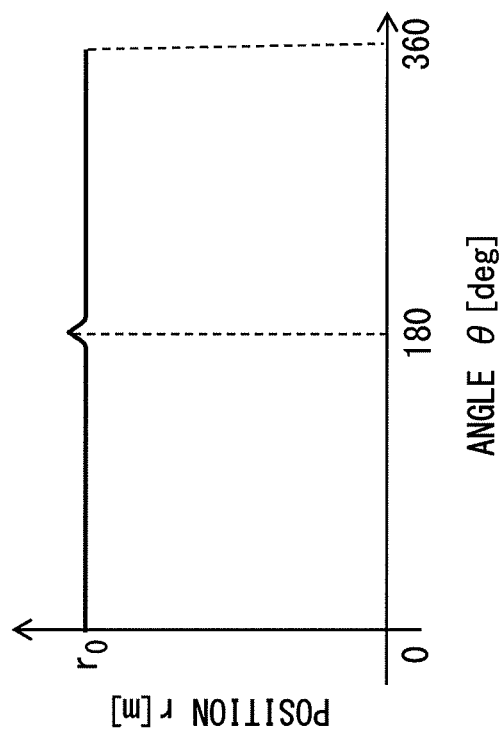
FIG. 8B is a diagram showing the locus of the machining point by using a two-dimensional coordinate system.

The feed speed and maximum acceleration are determined based on the value of the saturation flag in the above manner; next, a description will be given of an example of how the voltage saturation can be suppressed by adjusting the feed speed and maximum acceleration values. FIGS. 8A and 8B are diagrams showing the relationship between position r and angle θ relative to the center of a circle drawn by a machining point moving in a circular motion: FIG. 8A depicts the motion using a polar coordinate system, and FIG. 8B depicts the motion using a two-dimensional coordinate system. As depicted in FIGS. 8A and 8B, r is substantially constant (r=$r_0$) along the entire circumference except the region in the vicinity of 180°, but r>$r_0$ in the vicinity of θ=180°.

Figure 9B:
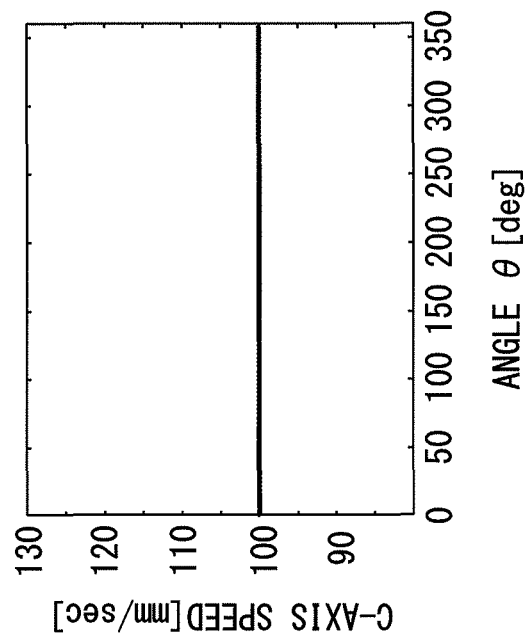
FIG. 9B is a diagram showing the angular dependence of C-axis speed when the machining speed is set to 100 [mm/sec]
Figure 9A:
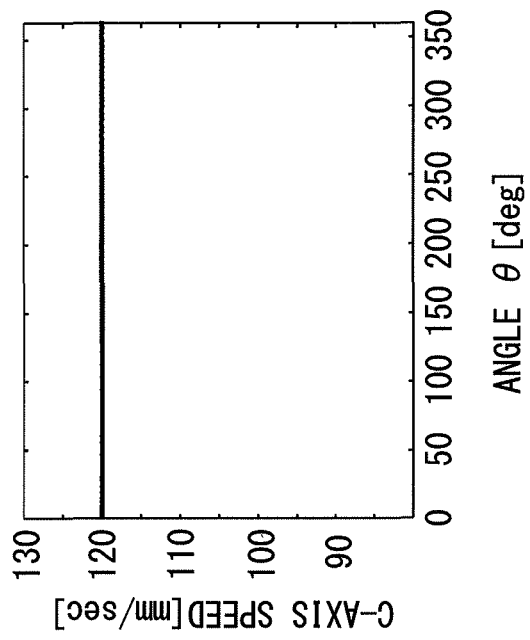
FIG. 9A is a diagram showing the angular dependence of C-axis speed when the machining speed is set to 120 [mm/sec]

It is assumed that the machining point moves at a constant speed in the counterclockwise direction. Since the C-axis speed which represents the circumferential speed is constant, the C-axis speed is constant irrespective of the angle θ, as shown in FIGS. 9A and 9B. The speed "120 [mm/sec]" shown in FIG. 9A is the speed that is set without considering the value of the saturation flag, and the speed "100 [mm/sec]" shown in FIG. 9B is for the case where the feed speed is reduced by considering the value of the saturation flag.

Figure 10A:
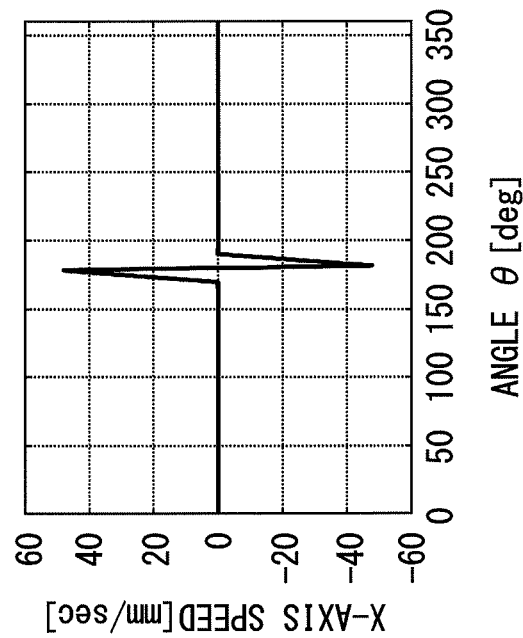
FIG. 10A is a diagram showing the angular dependence of X-axis speed when the machining speed is set to 120 [mm/sec]
Figure 10B:
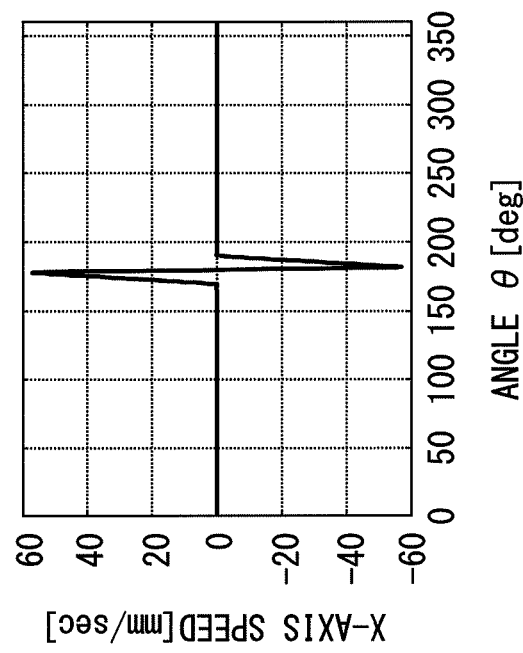
FIG. 10B is a diagram showing the angular dependence of X-axis speed when the machining speed is set to 100 [mm/sec]

FIGS. 10A and 10B show the angular dependence of the X-axis speed when the direction moving away from the center of the circle drawn by the machining point is taken as positive. FIG. 10A shows the case where the C-axis speed is set to 120 [mm/sec], as in FIG. 9A, and FIG. 10B shows the case where the C-axis speed is set to 100 [mm/sec], as in FIG. 9B. The X-axis speed is substantially held at 0 over the entire range except the region in the vicinity of 180°, because the machining point is at a fixed distance $r_0$ from the center. In the range of θ<180°, as the angle comes closer to 180°, the machining point moves away from the center, so that the X-axis speed increases. At θ=180°, since the machining point momentarily stays at a certain distance away from the center, the X-axis speed momentarily drops to 0. As the angle enters the range of θ>180°, the machining point is moved back toward the center, so that the X-axis speed becomes negative in value. From FIGS. 10A and 10B, it can be seen that the X-axis speed decreases as the feed speed is reduced.

FIGS. 11A and 11B show the angular dependence of the X-axis acceleration calculated by differentiating the X-axis speed of FIGS. 10A and 10B with respect to time. FIG. 11A shows the case where the C-axis speed is set to 120 [mm/sec], as in FIG. 9A, and FIG. 11B shows the case where the C-axis speed is set to 100 [mm/sec], as in FIG. 9B. It can be seen that the magnitude of the X-axis acceleration also decreases as the magnitude of the feed speed is reduced.

FIGS. 12A and 12B show the angular dependence of the X-axis jerk calculated by differentiating the X-axis acceleration of FIGS. 11A and 11B with respect to time. FIG. 12A shows the case where the C-axis speed is set to 120 [mm/sec], as in FIG. 9A, and FIG. 12B shows the case where the C-axis speed is set to 100 [mm/sec], as in FIG. 9B. It can be seen that the magnitude of the X-axis jerk also decreases as the magnitude of the feed speed is reduced.

Figure 13A:
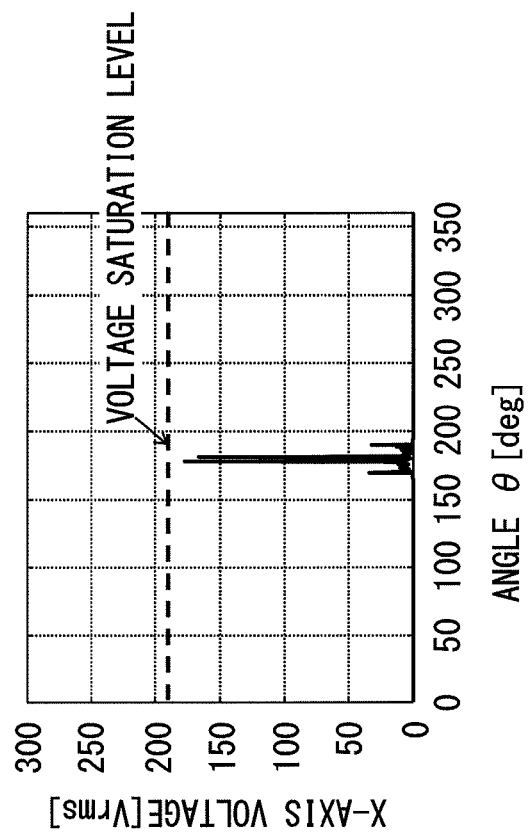
FIG. 13A is a diagram showing the angular dependence of X-axis voltage when the machining speed is set to 120 [mm/sec]
Figure 13B:
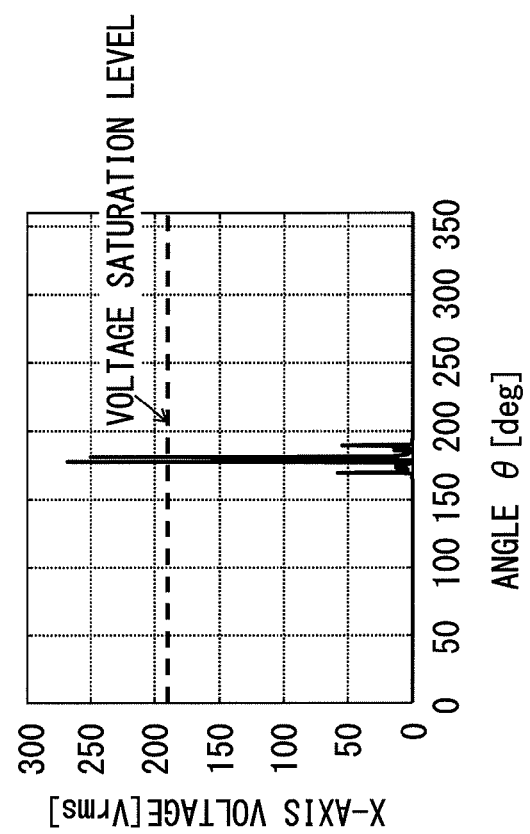
FIG. 13B is a diagram showing the angular dependence of X-axis voltage when the machining speed is set to 100 [mm/sec]

FIGS. 13A and 13B show the angular dependence of the X-axis voltage. FIG. 13A shows the case where the C-axis speed is set to 120 [mm/sec], as in FIG. 9A, and FIG. 13B shows the case where the C-axis speed is set to 100 [mm/sec], as in FIG. 9B. The X-axis voltage is calculated based on the feed speed, acceleration, and jerk, as will be described later. The figures also show the voltage saturation level. As shown in FIG. 13A, when the C-axis speed is set to 120 [mm/sec], the maximum value of the X-axis voltage is about 270 [Vrms]; since this maximum value exceeds the voltage saturation level of 180 [Vrms], it can be seen that voltage saturation occurs here. On the other hand, as shown in FIG. 13B, when the C-axis speed is set to 100 [mm/sec], the maximum value of the X-axis voltage is about 170 [Vrms]; since this maximum value is less than the voltage saturation level of 180 [Vrms], it can be seen that the voltage saturation is suppressed. As can be seen from the above discussion, the voltage saturation can be suppressed by the host control apparatus adjusting the feed speed in response to the notification of the saturation flag.

Next, a description will be given of how the commanded voltage is calculated based on the feed speed, acceleration, and jerk. Since the maximum feed speed, etc. that do not cause voltage saturation can be calculated by comparing the result of the calculation of the commanded voltage with the maximum voltage of the current amplifier, the motor can be driven at optimum speed while suppressing the voltage saturation.

The terminal voltage V [Vrms] of the synchronous motor can be calculated as shown below by using the feed speed, acceleration, and jerk.

$$V = \sqrt{(R \cdot Kcur \cdot \dot{x} + Lq \cdot Kcur \cdot \ddot{x} + K \cdot x)^2 + (x \cdot Lq \cdot Kcur \cdot \dot{x})^2} + Ksub \cdot (\text{friction} + \text{cutting reaction}).$$

where
x=ω (angular speed [rad/s]: rotary motor) v (speed [m/s]: linear motor),
Lq=per-layer inductance [H],
R=per-phase resistance [Ω],
Jm=motor inertia [kgm²],
Jl=load inertia [kgm²],
Mm=magnet weight [kg],
Ml=load weight [kg],
K=Kt (torque constant [Nm/Ap]: rotary motor), Kf (propulsive constant [N/Ap]: linear motor), $$Kcur = \sqrt{\frac{3}{2}} \cdot \frac{(Jm + Jl)}{Kt} \text{ (rotary motor)}$$

$$\sqrt{\frac{3}{2}} \cdot \frac{(Mm + Ml)}{Kf} \text{ (linear motor)},$$

and $$Ksub = \sqrt{\frac{3}{2}} \cdot \frac{(\text{friction} + \text{cutting reaction})}{K} \cdot R.$$

From the equation (3), the commanded voltage V is determined by the commanded speed, commanded acceleration, and commanded jerk. As a result, when the voltage command has exceeded the supply voltage, the host control apparatus, based on the result of the determination indicating the occurrence of voltage saturation, can perform control so that the voltage command does not exceed the supply voltage by reducing at least one of the commanded speed, commanded acceleration, and commanded jerk.

The equation (3) can be calculated as shown below. First, Vd and Vq are expressed by the following equation using id and iq.

$$\begin{bmatrix} V_d \\ V_q \end{bmatrix} = R \begin{bmatrix} i_d \\ i_q \end{bmatrix} + \begin{bmatrix} L_d \frac{d}{dt} & -\omega \cdot L_q \\ \omega \cdot L_d & L_q \frac{d}{dt} \end{bmatrix} \begin{bmatrix} i_d \\ i_q \end{bmatrix} + \omega \cdot \phi \begin{bmatrix} 0 \\ 1 \end{bmatrix}$$

where Ld and Lq are the inductances of the d-axis and q-axis, respectively, and Φ is the magnetic flux.

Here, letting $i_d=0$, and setting $$\frac{d}{dt}i_q = \dot{i}_q, \frac{d}{dt}i_d = \dot{i}_d,$$

one has $$V_d = -\omega \cdot L_q \cdot i_q$$

$$V_q = R \cdot i_q + L_q \frac{di_q}{dt} + \omega \cdot \phi$$

$$= R \cdot i_q + L \cdot \dot{i}_q + \omega \cdot \phi.$$

From the equation of motion, one has $$J\frac{d\omega}{dt} = K \cdot i_q.$$

Here, setting $$\frac{d\omega}{dt} = \dot{\omega},$$

one has $$i_q = \frac{1}{K}(J \cdot \omega)$$

$$\dot{i}_q = \frac{d}{dt}i_q = \frac{J}{K}\ddot{\omega}.$$

Substituting $i_d$ and $i_q$ into the above equations, one has $$V_d = -\omega \cdot L_q \cdot i_q$$

$$V_q = R \cdot i_q + L_q \frac{di_q}{dt} + \omega \cdot \phi$$

$$= R \cdot i_q + L \cdot \dot{i}_q + \omega \cdot \phi.$$

Substituting these into $V=\sqrt{(V_d^2+V_q^2)}$, and using the coefficient Ksub for converting the (friction+cutting reaction) term into the voltage range, one has $$V = \sqrt{(R \cdot Kcur \cdot \dot{x} + Lq \cdot Kcur \cdot \ddot{x} + K \cdot x)^2 + (x \cdot Lq \cdot Kcur \cdot \dot{x})^2} +$$

$$Ksub \cdot (\text{friction} + \text{cutting reaction}).$$

On the other hand, the maximum terminal voltage Vmax [Vrms] that the amplifier can produce is calculated as follows by considering the dead zone:

$$Vmax = (\text{supply voltage}) \cdot \sqrt{2} \cdot \frac{3}{\pi}\left(\frac{2T-\Delta}{2T}\right)\bigg/\sqrt{2}$$

where supply voltage [Vrms], T=speed interrupt period [125 μs], and Δ=dead zone width [8 μs].

In a system such as a machine tool that is driven by a synchronous motor, the first term of the above equation (3) can be calculated from the commands. However, from the viewpoint of processing time, it is difficult to calculate it in real time by control software. It is also difficult to accurately estimate the cutting reaction and friction. As a result, if the machining accuracy degrades due to the occurrence of voltage saturation, it is not easy to identify the cause. In view of this, in the present invention, since the voltage command for the d-phase and q-phase is calculated in the current control, it is determined whether the voltage command has exceeded the supply voltage level, and the result of the determination is sent to the host control apparatus.

Embodiment 2

Figure 14:
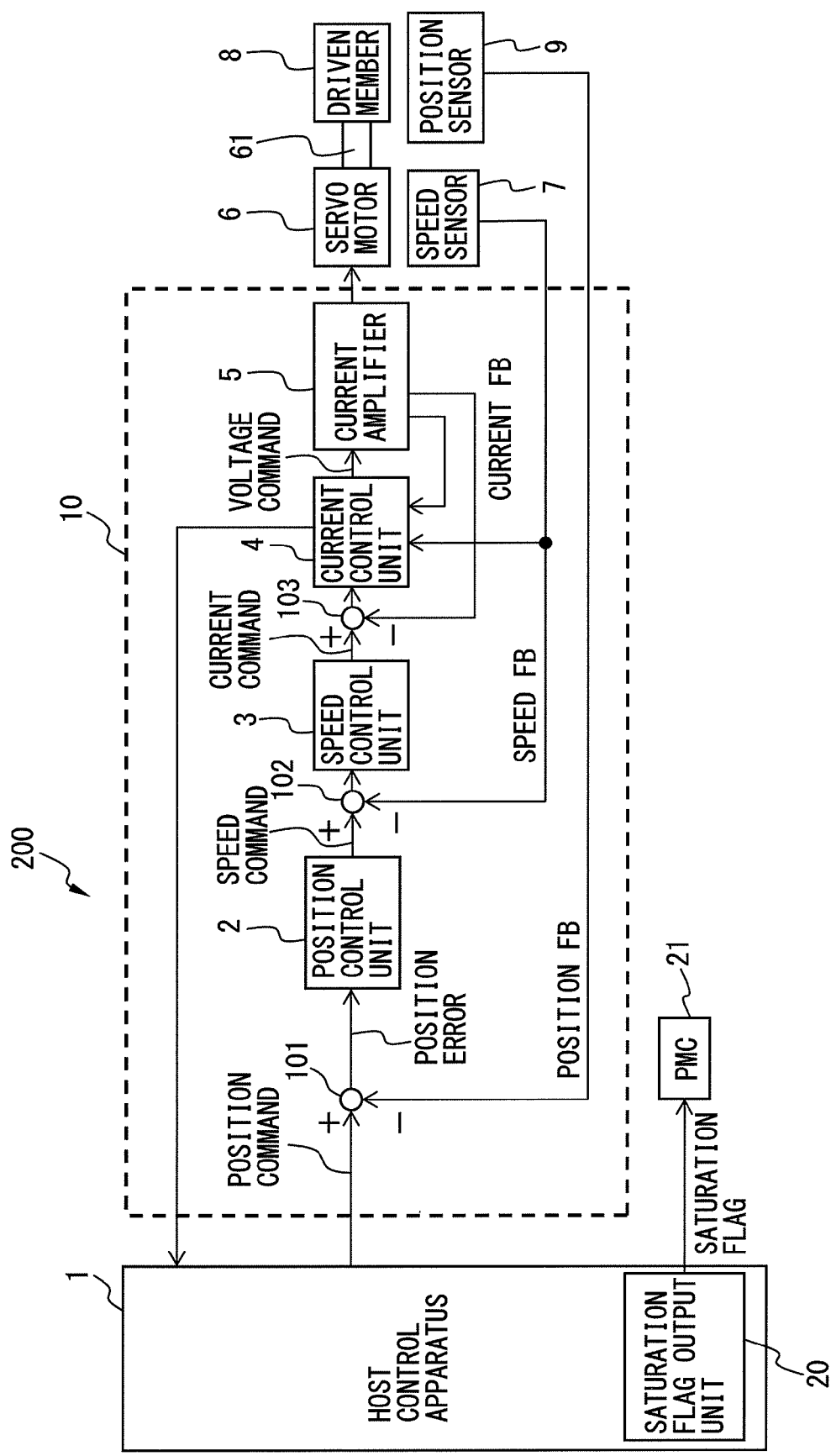
FIG. 14 is a diagram showing the configuration of a motor control system according to a second embodiment of the present invention.

Next, a motor control system according to a second embodiment will be described. The motor control system according to the second embodiment is characterized in that the host control apparatus includes a saturation flag output unit which, based on the result of the determination made by the voltage saturation processing unit, outputs a saturation flag when the voltage command has exceeded the supply voltage. FIG. 14 is a diagram showing the configuration of the motor control system 200 according to the second embodiment. The same component elements as those in the motor control system 100 of the first embodiment are designated by the same reference numerals, and the details of such component elements will not be further described herein. As shown in FIG. 14, the motor control system 200 according to the second embodiment is characterized in that the host control apparatus 1 includes the saturation flag output unit 20 which, based on the result of the determination made by the voltage saturation processing unit 41 (see FIG. 3) in the current control unit 4, outputs a saturation flag when the voltage command has exceeded the supply voltage.

When the host control apparatus 1 receives the voltage saturation flag from the voltage saturation notifying unit 42 (see FIG. 3) in the current control unit 4, the saturation flag output unit 20 passes the received saturation flag to a programmable machine controller (PMC) 21. The PMC is a device that controls the operation of a machine or equipment in accordance with a programmed sequence, conditions, etc. Since the saturation flag output unit 20 outputs the saturation flag to the outside of the host control apparatus 1, the user can be alerted to the occurrence of voltage saturation and can thus recognize that the voltage saturation is the cause of the accuracy degradation. It also becomes possible for the user to reduce at least one of the commanded speed, commanded acceleration, and commanded jerk and thus mitigate the effects of voltage saturation in order to ensure the required machining accuracy. In the illustrated example, the voltage saturation flag is output to the external device 21 via the host control apparatus 1, but in order to speed up processing, the voltage saturation flag may be supplied from the voltage saturation notifying unit 42 directly to the external device 21.

Embodiment 3

The first embodiment has shown that the voltage saturation can be avoided by reducing the C-axis speed, i.e., the feed speed, from 120 [mm/sec] to 100 [mm/sec], as shown in FIGS. 9A and 9B to 13A and 13B. The reduced feed speed here is constant irrespective of the angle θ. As a result, the overall work time increases because the feed speed is reduced uniformly over the entire range of angles including the angle of 180° at which the X-axis speed, X-axis acceleration, etc. increase.

Figure 15B:
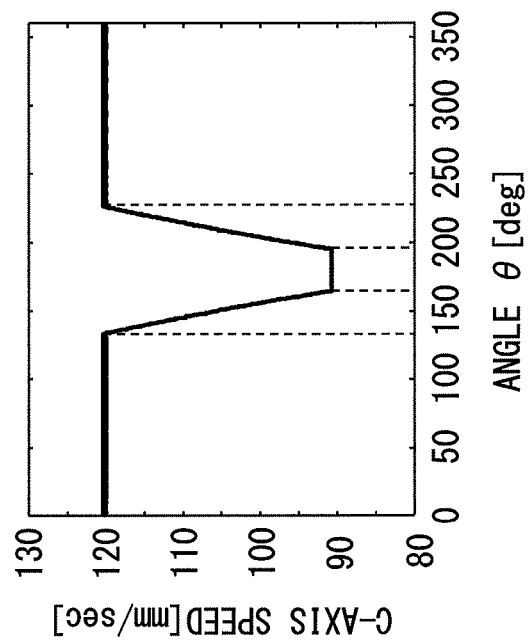
FIG. 15B is a diagram showing the angular dependence of C-axis speed when the machining speed is set to 100 [mm/sec] in the motor control system according to the third embodiment of the present invention.
Figure 15A:
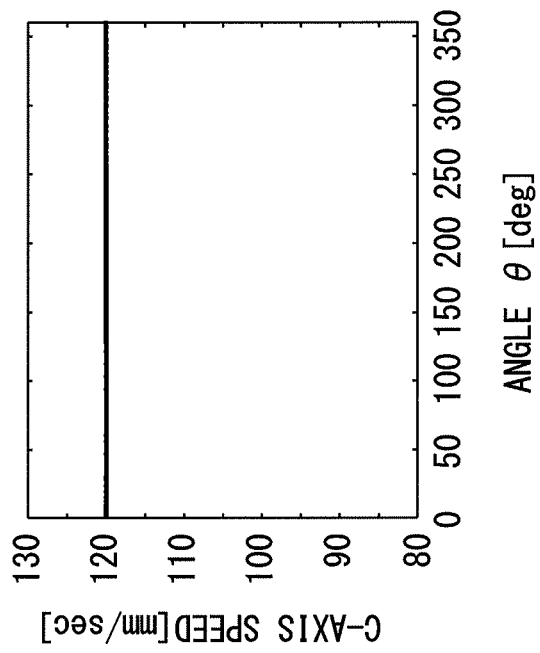
FIG. 15A is a diagram showing the angular dependence of C-axis speed when the machining speed is set to 120 [mm/sec] in a motor control system according to a third embodiment of the present invention.

By contrast, a motor control system according to a third embodiment is characterized in that when the voltage command has exceeded the supply voltage, the host control apparatus 1, based on the result of the determination made by the voltage saturation processing unit 41, performs control so that the voltage command does not exceed the supply voltage by reducing at least one of the commanded speed, commanded acceleration, and commanded jerk only for a predetermined region where the voltage command exceeds the supply voltage. Examples of graphs depicting the angular dependence of the C-axis speed in the motor control system according to the third embodiment are shown in FIGS. 15A and 15B. FIG. 15A shows the case where the C-axis speed is maintained constant irrespective of the angle, as in FIG. 9A, i.e., the condition under which voltage saturation occurs. On the other hand, FIG. 15B shows an example in which the C-axis speed is reduced down to 90 [mm/sec] only in a limited region centered about the angle θ=180° but is maintained constant at 120 [mm/sec] in other regions. More specifically, the C-axis speed is maintained constant at 120 [mm/sec] over the range of 0°≤θ≤130° and also over the range of 230°≤θ≤360°, while on the other hand, the C-axis speed is gradually reduced from 120 [mm/sec] down to 90 [mm/sec] in proportion to the angle over the range of 130°≤θ≤165°. After maintaining the C-axis speed at 90 [mm/sec] over the range of 165°≤θ≤195°, the C-axis speed is gradually increased from 90 [mm/sec] up to 120 [mm/sec] in proportion to the angle over the range of 195°≤θ≤230°. This is only one example, and the method of reducing and increasing the C-axis speed is not limited to this particular example.

In the motor control system of the third embodiment, the motor can be driven at high speed in regions where voltage saturation does not occur, while on the other hand, in the predetermined region where voltage saturation can occur, the motor is driven at reduced speed, thus avoiding the occurrence of voltage saturation. In this way, the overall machining time can be reduced. FIGS. 15A and 15B have shown the example in which the C-axis speed as the feed speed is reduced only in the predetermined region. Alternatively, the acceleration or jerk may be reduced only in the predetermined region where voltage saturation can occur.

Embodiment 4

Figure 16:
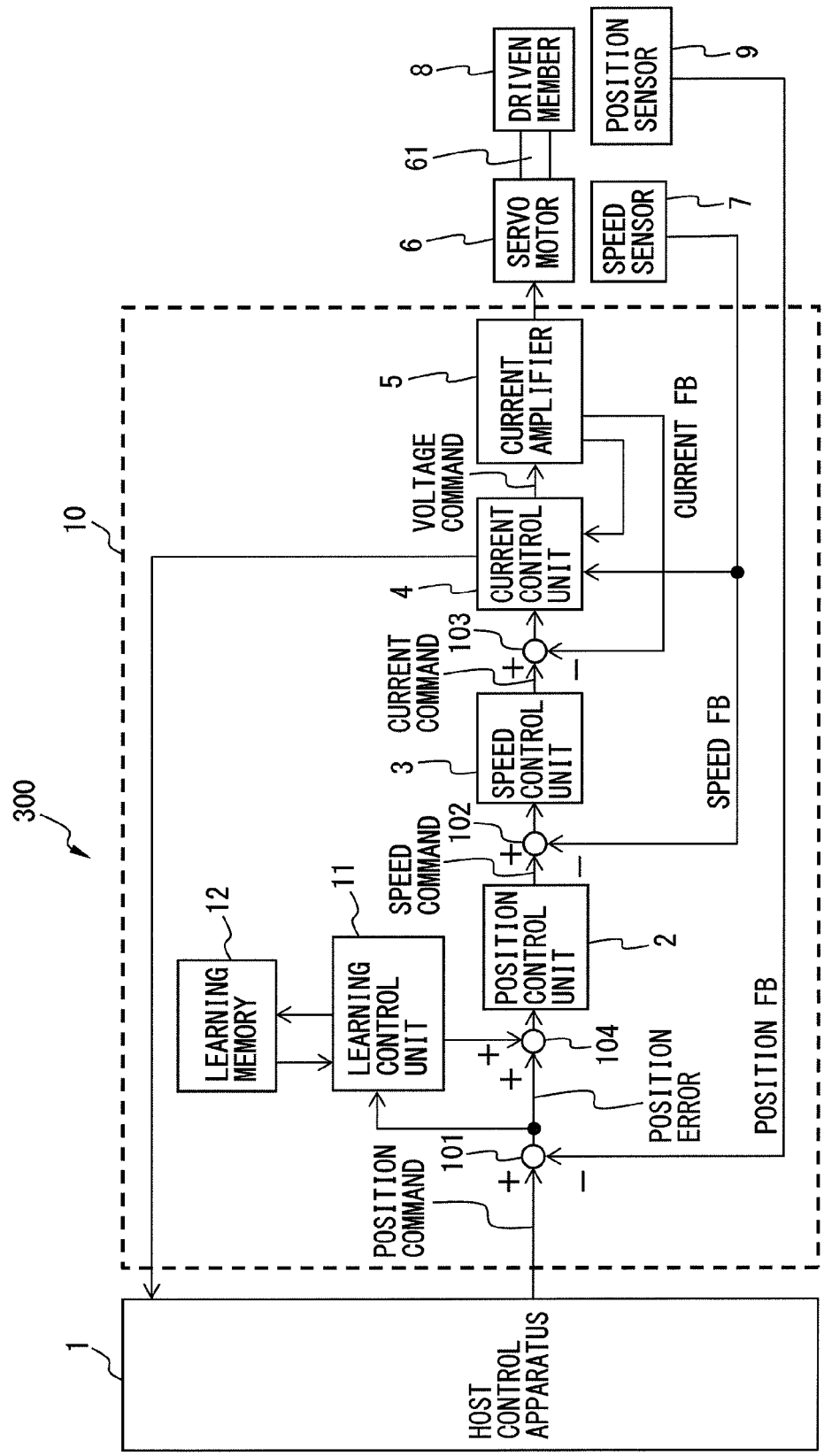
FIG. 16 is a diagram showing the configuration of a motor control system according to a fourth embodiment of the present invention.

Next, a motor control system according to a fourth embodiment will be described. FIG. 16 is a diagram showing the configuration of the motor control system according to the fourth embodiment. The motor control system 300 according to the fourth embodiment differs from the motor control system 100 according to the first embodiment by the inclusion of a learning control unit 11 for driving in accordance with the position command provided from the host control apparatus 1. The same component elements as those in the motor control system 100 of the first embodiment are designated by the same reference numerals, and the details of such component elements will not be further described herein.

The learning control unit 11 receives position error data, calculates the amount of learned correction, and stores it in a learning memory 12. The amount of learned correction is added in a fourth adder 104 to the position error data, and the corrected position error data is supplied to the position control unit 2. The learning control unit 11 calculates a new amount of learned correction based on the amount of learned correction stored in the learning memory 12 one cycle back, and thus repeats learning so as to reduce the position error.

If the position command contains a jerk component that causes voltage saturation, then when the learning control is enabled, the commanded voltage may exceed the supply voltage even in the case where the commanded voltage does not exceed the supply voltage in the normal feedback control. In view of this, provisions are made in the present embodiment to be able to avoid voltage saturation by detecting the occurrence of voltage saturation and thereby reducing the feed speed, etc. even when the learning control is enabled.

While the embodiments of the motor control system according to the present invention have been described above for the case where the system incorporates only one control apparatus, the number of control apparatus need not be limited to one, but a plurality of control apparatus may be incorporated.

What is claimed is:

1. A motor control system comprising a plurality of control apparatuses for controlling a motor, and a host control apparatus which provides a command to said control apparatus, wherein each of said control apparatuses include:
   a position control unit which controls position based on a position command and commanded speed provided from said host control apparatus;
   a speed control unit which controls speed based on a speed command supplied from said position control unit;
   a current control unit which controls current based on a current command supplied from said speed control unit; and
   a current amplifier which amplifies current for driving said motor, based on a voltage command supplied from said current control unit, and wherein
   said current control unit includes:
   a voltage saturation processing unit which determines whether said voltage command has exceeded supply voltage of said current amplifier, and which outputs a result of said determination; and
   a voltage saturation notifying unit which notifies said host control apparatus of the result of said determination made by said voltage saturation processing unit.

2. The motor control system according to claim 1, wherein said host control apparatus includes a saturation flag output unit which, based on the result of said determination, outputs a saturation flag when said voltage command has exceeded said supply voltage.

3. The motor control system according to claim 1, wherein when said voltage command has exceeded said supply voltage, said host control apparatus, based on the result of said determination, performs control so that said voltage command does not exceed said supply voltage by reducing at least one of said commanded speed, commanded acceleration, and commanded jerk.

4. The motor control system according to claim 1, wherein when said voltage command has exceeded said supply voltage, said host control apparatus, based on the result of said determination, performs control so that said voltage command does not exceed said supply voltage by reducing at least one of said commanded speed, commanded acceleration, and commanded jerk only for a predetermined region where said voltage command exceeds said supply voltage.

5. The motor control system according to claim 1, further comprising a learning control unit for driving in accordance with said position command provided from said host control apparatus.

6. The motor control system according to claim 1, wherein said voltage saturation processing unit holds the result of said determination for a predetermined period of time.

7. The motor control system according to claim 1, wherein said host control apparatus calculates a voltage command V from said position command in accordance with a prescribed equation and, if said voltage command V exceeds a predetermined maximum voltage, then reduces said voltage command V by reducing at least one of said commanded speed, commanded acceleration, and commanded jerk, said prescribed equation being given as $$V = \sqrt{(R \cdot Kcur \cdot \dot{x} + Lq \cdot Kcur \cdot \ddot{x} + K \cdot x)^2 + (x \cdot Lq \cdot Kcur \cdot \dot{x})^2} + Ksub \cdot (\text{friction} + \text{cutting reaction}).$$

where
- $x = \omega$ (angular speed [rad/s]: rotary motor), v (speed [m/s]: linear motor),
- $\dot{x}$ = commanded acceleration,
- $\ddot{x}$ = commanded jerk,
- Lq = per-layer inductance [H],
- R = per-phase resistance [u],
- Jm = motor inertia [kgm$^2$],
- Jl = load inertia [kgm$^2$],
- Mm = magnet weight [kg],
- Ml = load weight [kg],
- K = Kt (torque constant [Nm/Ap]: rotary motor), Kf (propulsive constant [N/Ap]: linear motor), $$Kcur = \sqrt{\frac{3}{2}} \cdot \frac{(Jm + Jl)}{Kt} \text{ (rotary motor)}$$

$$\sqrt{\frac{3}{2}} \cdot \frac{(Mm + Ml)}{Kf} \text{ (linear motor)},$$

and $$Ksub = \sqrt{\frac{3}{2}} \cdot \frac{(\text{friction} + \text{cutting reaction})}{K} \cdot R.$$

* * * * *